(12) United States Patent
Malevich et al.

(10) Patent No.: US 11,068,802 B2
(45) Date of Patent: Jul. 20, 2021

(54) HIGH-CAPACITY MACHINE LEARNING SYSTEM

(71) Applicant: Facebook, Inc., Menlo Park, CA (US)

(72) Inventors: Andrey Malevich, San Francisco, CA (US); Ou Jin, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 983 days.

(21) Appl. No.: 15/638,210

(22) Filed: Jun. 29, 2017

(65) Prior Publication Data

US 2019/0005406 A1   Jan. 3, 2019

(51) Int. Cl.
*G06N 20/00* (2019.01)
*G06F 17/18* (2006.01)
*G06F 17/11* (2006.01)
*G06F 16/2458* (2019.01)
*G06N 5/02* (2006.01)
*G06F 17/16* (2006.01)

(52) U.S. Cl.
CPC ......... *G06N 20/00* (2019.01); *G06F 16/2468* (2019.01); *G06F 17/11* (2013.01); *G06F 17/18* (2013.01); *G06N 5/022* (2013.01); *G06F 16/2462* (2019.01); *G06F 17/16* (2013.01)

(58) Field of Classification Search
CPC .................... G06N 20/00; G06N 5/022; G06F 16/24578; G06F 16/2462; G06F 16/2468; G06F 17/11; G06F 17/16; G06F 17/18
See application file for complete search history.

(56) References Cited

U.S. PATENT DOCUMENTS

2009/0157664 A1\*   6/2009   Wen ..................... G06Q 50/14
2017/0039483 A1\*   2/2017   Cheng ................ G06F 16/2455

OTHER PUBLICATIONS

He et al., Neural Collaborative Filtering, 26th Internation Word Wide Web Conference, 10 pages, Apr. 2017. (Year: 2017).\*
Rendle, Steffen, Social Network and Click-Through Prediction with Factorization Machines, KDDCup '12, 2012. (Year: 2012).\*
Juan, Y. et al., "Field-aware Factorization Machines," NTU CSIE MLGroup, 2015, 18 pages.
Mcmahan, B., "Follow-the-Regularized-Leader and Mirror Descent: Equivalence Theorems and L1 Regularization," Proceedings of the Fourteenth International Conference on Artificial Intelligence and Statistics, 2011, pp. 525-533.
Rendle, S. "Factorization Machines," IEEE 10th International Conference on Data Mining, 2010, pp. 995-1000.

\* cited by examiner

*Primary Examiner* — Kamran Afshar
*Assistant Examiner* — Marshall L Werner
(74) *Attorney, Agent, or Firm* — Fenwick & West LLP (57) ABSTRACT

The present disclosure is directed to a high-capacity training and prediction machine learning platform that can support high-capacity parameter models (e.g., with 10 billion parameters). The platform generates a model for a metric of interest based on a known training set. The model includes parameters indicating importances of different features of the model, taken both singly and in pairs. The model may be applied to predict a value for the metric for given sets of objects, such as for a pair consisting of a user object and a content item object.

11 Claims, 6 Drawing Sheets

HIGH-CAPACITY MACHINE LEARNING SYSTEM

FIELD OF ART

The present invention generally relates to the field of information systems, and more specifically, to using machine learning to train prediction models.

BACKGROUND

Various businesses rely on machine learning models to process large and complex data sets ("big data") to provide valuable services to their customers. For example, a social networking service may implement a social networking system to provide users with personalized or targeted services that utilize big data. Big data is a broad term referring to the use of predictive methods to extract values from large datasets, which are generally so complex that traditional data processing systems are often inadequate in providing relevant insights. For example, analysis of the datasets can find new correlations, trends, patterns, categories, etc. between, e.g., a user and a product or service. However, existing data processing systems generally have computing capacity for handling only small models with a limited set of parameters (e.g., 10 million parameters). On the other hand, systems that are capable of processing a larger set of parameters often require substantial time, memory, and CPU usage.

SUMMARY

A high-capacity machine learning system trains a model predicting values of a corresponding metric based on a given set of features. The model includes parameters $\alpha_{f(i), f(j)}$ indicating the importance of given pairs of features on the metric value. The model may additionally include parameters indicating the importance of the various features in isolation upon the metric value, as well as an embedding matrix indicating variable interactions. Use of the parameters $\alpha_{f(i), f(j)}$ advantageously permits greater model accuracy, with only a small increase in the amount of required memory.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Disclosed are embodiments directed to a high-capacity training and prediction machine learning platform that can support high-capacity parameter models (e.g., with 10 billion parameters). In one embodiment, the platform implements a distributed training framework utilizing shard servers to increase training speed and a generic feature transformation layer for joint updating. The model(s) generated by the platform can be utilized in conjunction with existing dense baseline models to predict compatibilities between different groupings of objects (e.g., a group of two objects, three objects, etc.), such as between an object representing a user and an object representing a content item.

The platform can include a training system 110 and a prediction system 120. The training system 110 can execute a supervised learning process to learn about different ordered tuples based on multiple data sets representative of features associated with objects of the tuples.

Operations of the supervised learning process can be executed in a distributed way based on database shards to enable high-capacity updating of the prediction model. That is, use of shards enables updating of a substantially high volume of parameters associated with the supervised learning process (e.g., 10 billion weights). The shards can be used in both the training stage and the prediction stage. In particular, the database shards can be organized in accordance with at least two tiered sets, where each tiered set (or at least some of the tiered sets) includes different tiers of shard servers. A particular tiered set can correspond to a particular learning model.

In an example for the training stage, the training system can employ tiered training sets. A tiered set can include different tiers of shard servers, where each tier of shard servers is configured to perform an operation of a set of operations associated with the first learning model. Use of the tiered sets of shard servers advantageously increases both the maximum size of the prediction model (e.g., 10 billion parameters, 32 billion parameters, etc.) and the training speed (e.g., 10 times the speed as compared to a single-server training).

As used here, the term "database shard" or "shard" is a partition of data in a database, where each shard is held on a separate database server instance to spread load. Each shard (or server) acts as the single source for a subset of data (e.g., a portion of the multiple data sets representative of features associated with a tuple). As shards can be distributed across a number of much less expensive commodity servers, such use advantageously enables faster processing at low cost.

Freshly trained models output from the shard servers of the training system can be allocated to shard servers of the prediction system. Use of shards in the prediction stage advantageously enables faster and higher capacity processing.

As used herein, the term "tuple" refers to a pair of objects, such as a user u and an advertisement (hereinafter, "ad") v sharing (or not sharing, as appropriate) a particular feature. As used here, the term "feature" or "features" refers to characteristics shared between objects within a grouping (e.g., an ordered tuple). For example, the tuple could be a pair representing a 25 year-old user and an ad for toys for children, where there is a negative conversion rate indicating no interest in the toy ad from the 25 year-old user. The multiple data sets can be training datasets, e.g., $\{(u_j, v_j, Y_i), i=1, \ldots N\}$, where u is an attribute feature vector with dimension m and v is an attribute feature vector with dimension n. Each attribute feature vector includes a vector of one or more features of a respective object (e.g., a user u or an ad v). For example, a user's features can be liked pages, demographics, installed apps, pixels visited, etc.; an ad's features can be, for example, expressed features, such as targeting keywords, or implied features, such as object IDs associated with promotional objects related to the ad. Under this simplification, the outcome y can be a binary variable y of the set $\{-1,1\}$ for a user-ad pair (e.g., indicating a "click" or "no click"), or it can be a non-binary variable (i.e., real-valued) representative of a degree of correlation for the user-ad pair (e.g., y is a real-valued number such as 1.2, 0.5, etc.). As described in more detail below with respect to FIG. 2, the prediction model that is generated from the training data constitutes a set of weights corresponding to individual features, or to pairs of features. The weights can then be used to compute a prediction value, or probability of compatibility, for a new tuple of objects; that is, the prediction value can be computed using a function of the weights. The prediction value can provide an indication whether a particular object would be compatible with a given object. The prediction value can be used for ranking unknown data (e.g., a new pair of user and ad).

Note that while the example discussed above refers to a user and ad pair for purpose of illustration, the disclosed embodiments may be implemented to determine similarity, or correlations, between other types of objects and groupings other than pairs (i.e., more than two objects). Examples of other objects can include a user of a social networking system and a page of the social networking system. In another example, the objects can include the user of the social networking system and an entity outside of the social networking system, e.g., a mobile application (hereinafter, "app"), conversion pixel(s), a website, a movie, a television show, an audio-streaming program, etc. In yet another example, the objects can include two products, e.g., a gaming app and a video-editing book.

Figure 1:
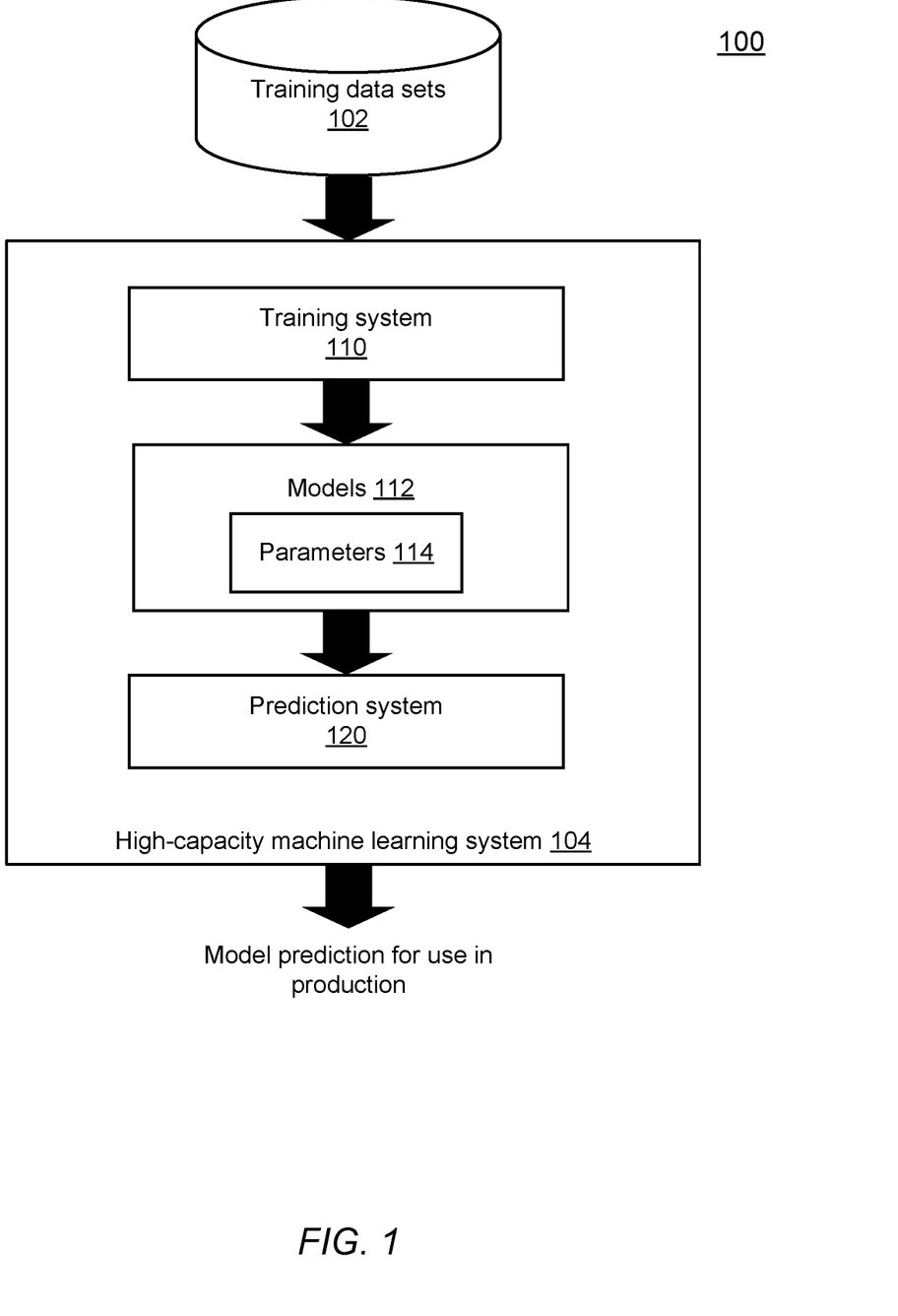
FIG. 1 is a data flow diagram of a high capacity machine learning system for generating a prediction model for predicting compatibility between two objects based on attributes of the objects, according to one embodiment

Referring now to the figures, FIG. 1 is a data flow diagram 100 of a high capacity machine learning system 104 for generating a prediction model for predicting compatibility between two objects based on attributes of the objects, according to one embodiment. The high-capacity machine learning system 104 (or simply, the "system 104") can be implemented by a computer processor in a computer server system as configured by a set of executable instructions. Alternatively, the system 104 can be implemented by application specific integrated circuit (ASIC), a programmable controller, a field programmable gate array (FPGA), or other electronic circuitry.

The system 104 can train a model 112 (e.g., prediction model), such as a supervised learning model, based on training data sets 102 of features of ordered tuples of objects to determine a level of compatibility, or matching, between two objects. Note, for simplicity, FIG. 1 is discussed in reference to generation of one model; however, the high-capacity machine learning system 104 is configured to generate multiple models for predicting compatibilities for different pairings of objects.

The system 104 generates the model 112 by processing sparse training data sets 102. The term "sparse" as used here refers to the fact that out of billions of features, only a few dozen would be pulled for a given prediction of compatibility. (For example, where one set of features is a large number of representative pages of a social networking system, for which the user may expressly indicate approval (e.g., "Liked"), most users will only have indicated approval for a small subset of those pages, leading those features to be quite sparse.) The training data sets 102 are input into the training system 110 which can be instantiated as a distributed, multi-threaded computer process running on a computer server system (e.g., one or more computing devices) with suitable data structures to store the model 112 or the training data sets 102. The data structures can be instantiated on one or more memory devices of the computer system.

An individual data set (of the training data sets 102 received by the training system 110) can include data about an ordered tuple of two objects, where each object is represented as a collection of attributes, or features, of the respective object. For example, the individual data set can include a feature representative of a first object (e.g., "Obj. u'), a feature representative of a second object (e.g., "Obj. v'), and a label expressing the output of a given metric evaluated based on the first object and the second object. The label can be a binary value y of the set $\{-1,1\}$. For example, where Obj. u is a user and Obj. v is an ad, the label can be a "click" or "no click," a "conversion" or "no conversion," among others. In some embodiments, the label can be a non-binary value, or real-valued, to indicate a degree of correlation (e.g., −1, 0, 1, 2, 5.1, etc.).

The training system 110 can attempt to update the parameters 114 by analyzing the training data sets 102. The parameters 114 can be used to accurately determine a compatibility score for a given object and its potential matching object. The training system 110 can perform a set of operations in its training of the model 112 (and updating of the parameters 114), where the set of operations can be executed by a tiered set of shard servers. Each tier of shard servers can be configured to implement a particular operation of the set of operations.

The prediction system 120 can receive the trained model(s) 112 from the training system 110. Based on the model(s) 112, the prediction system 120 can determine one or more prediction values in response to requests from a production system, where the production system can utilize the values to find a compatible object for a given object. An example production system can be an Ad Finder that selects an ad most appropriate for a given context (such as a particular user), or a Feed Selector that selects a set of postings that are most appropriate for a given context (e.g., for a given user). The prediction system 120 can be implemented by a computer processor of the computer system as configured by a set of executable instructions. The prediction system 120 can be coupled to an interface that receives real-time training data of production events in the same feature space as the training data sets 102. The prediction system 120 can then utilize the model 112 along with production models (e.g., from local model cache) to make estimations and/or predictions of potential objects that are compatible with inputs associated with the production events.

Figure 2:
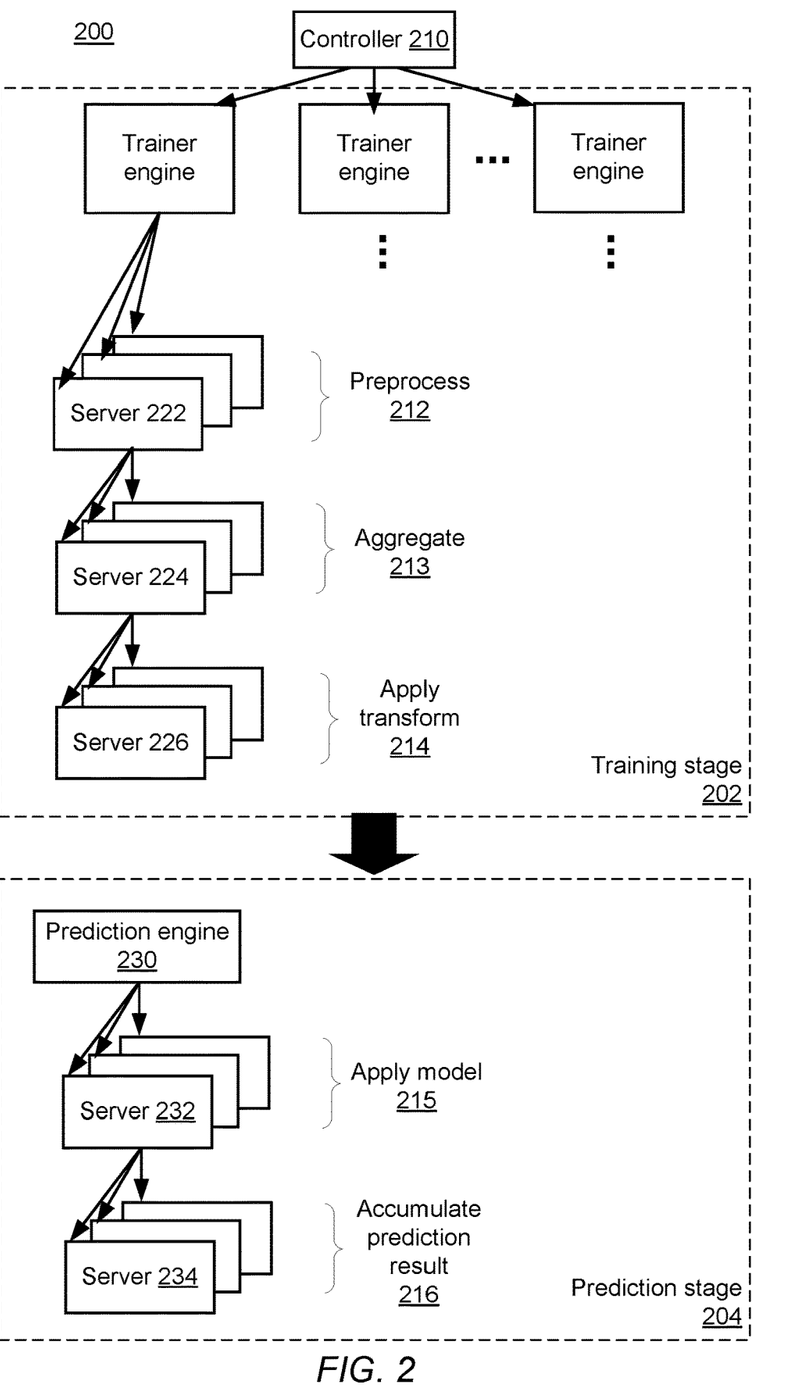
FIG. 2 is a data flow diagram of processing stages of the high-capacity machine learning system based on sharding of operations within each stage, in accordance with some embodiments.

FIG. 2 is a data flow diagram of processing stages of the high-capacity machine learning system 200 ("system 200") based on sharding of operations within each stage, in accordance with some embodiments. The system 200 can be the system 104 of FIG. 1. The system 200 attempts to learn a prediction model through implementation of a training stage 202 and a prediction stage 204. Each stage is implemented using database shards, where pieces of the model are processed and stored at different shard servers. Use of shards enables implementation of a high capacity parameter model as it increases the speed of the update and the volume of parameters to be updated. Operations of the prediction model can be executed in a distributed way based on database shards that are organized in accordance with at least two tiered sets, where each tiered set includes different tiers of shard servers.

A controller 210 operates as a "master" server that is configured to manage and distribute pieces of the workload to the different tier sets of shard servers. In embodiments in which multiple different types of learning models are used, a particular tiered set can correspond to a particular learning model. In the example, a first tier of shard servers 222 can be allocated to "preprocess" operation 212 of the training stage 202; a second tier of shard servers can be allocated to "aggregate" operation 213 of the training stage 202; and a third tier of shard servers can be allocated to "linear combination" transformation operation 214 of the training stage 202. At each of the first, second, and third tiers, a set of servers (e.g., 222, 224, or 226) is dedicated to execute a particular operation allocated to that tier, where the particular operation is one operation of a set of operations associated with the tiered set.

In the prediction stage 204, models updated in the training stage 202 can similarly be communicated to the prediction engine 230, which distributes the processing to a tiered set of different tiers of shard servers. For example, a first tier of shard servers 232 is configured to apply the model 215 received from the training stage on new data received from a production system. In another example, a second tier of shard servers 234 is configured to accumulate prediction results 216 from various shard servers, where the accumulate result can be pushed back to the training stage to update the model being trained.

Figure 3:
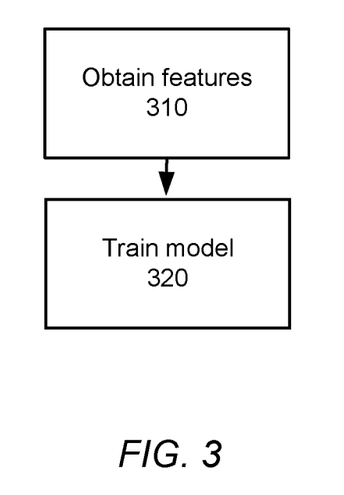
FIG. 3 is a flowchart illustrating operations performed by the training system when generating the model, according to one embodiment.

FIG. 3 is a flowchart illustrating operations performed by the training system 110 when generating the model 112, according to one embodiment.

The training system 110 obtains 310 values for the given set of features, along with corresponding values of the metric for which the model is trained, for each of the set of prior occurrences that constitute the training set. In some embodiments, the set of features includes features for an object being evaluated in the current context (e.g., an ad for potential display to the current user), such as an object ID; features for the current user, such as indications, for each of a given canonical set of pages on a social networking system, of whether the current user has explicitly indicated approval for that page; and transformations such as boosted decision tree (BDT) leaves. (A single feature may include multiple sub-features, in which case it is considered a multi-valued feature. For example, a feature indicating whether a user has explicitly indicated approval for a page may have p sub-features, each representing whether a user has explicitly indicated approval for the $p^{th}$ page, for some set of p different pages. The term "feature" as used herein may include a sub-feature of a multi-valued feature.) Other types of features in this or other embodiments include identifiers of ads with which the user has previously interacted, and identifiers of topics in which the user has been determined to have shown an interest (either explicitly or implicitly). The metric might be, for example, whether or not the current user clicked on or otherwise selected an object (such as an ad or a posting) that was presented to the user.

The training system trains 320 the model 112 according to Equation 1, below.

$$\hat{y}(x) = w_0 + \sum_i w_i x_i + \sum_{i \neq j} \alpha_{f(i), f(j)} \langle \vec{v_i}, \vec{v_j} \rangle x_i x_j \quad [\text{Eq'n 1}]$$

In Equation 1, x represents the vector of values of the given set of n features (including sub-features), and y represents the value of the metric for which the model is trained. The values $w_o$, $w_i$, $\langle v_j \rangle$, and $\alpha_{f(i), f(j)}$ are the parameters that define the model 112. $w_o$, and w (consisting of the n elements $w_i$), are vectors of n real numbers, where n is the number of features. (n includes the number of sub-features of the features. For example, if there were two multi-valued features, the first with c sub-features and the second with d sub-features, then n would be (c+d).) Each vector w indicates the importance of the $i^{th}$ feature (or sub-feature) in determining the value of the metric. In the pair $\langle v_i, v_j \rangle$, each $v_m$ is an embedding vector that is a row from the n×k embedding matrix V, describing the $m^{th}$ feature using k factors, where k is the dimensionality of factorization. V indicates the importance of the interactions of two particular feature (or sub-feature) values, such as the interaction of a particular advertisement (a value of an advertisement identifier feature type) and a particular web page. The value $\langle v_i, v_j \rangle$ is computed as the dot product of $v_i$ and $v_j$, i.e., $\langle v_i, v_j \rangle = v_i \cdot v_j$. In some embodiments, V is initialized with uniformly distributed random real-valued numbers.

The importance value $\alpha_{f(i), f(j)}$ indicates the predictive importance of the interaction of the $i^{th}$ and $j^{th}$ features (not sub-features) on the metric value. (In the case of multi-valued features, the multi-valued feature, and not one of its sub-features, is what is evaluated as a whole.) Thus, the use of the term $w_i x_i$ models the importance of a particular feature (or sub-feature) i for predicting the metric value, and $\alpha_{f(i), f(j)}$ models the importance of the interaction of a given pair of the features (not including sub-features) for predicting the metric value. This captures more information about the behavior of the different features, allowing the model to essentially ignore the interactions of certain pairs of features while weighting the interactions of other pairs of features very highly, thus providing a richer, more accurate model. For example, if the $i^{th}$ feature corresponded to ad identifier, and the $j^{th}$ feature corresponded to whether the user has expressed approval for a web page on a social networking system, the value of $\alpha_{f(i), f(j)}$ would indicate how important user approval of a web page is to whether the user will click an ad (assuming that the metric in question is click-through rate). (In contrast, the value $\langle v_i, v_j \rangle$ for the $i^{th}$ and $j^{th}$ feature (or sub-feature) indicates the specific importance of the interaction of a particular ad and a particular web page as denoted by the sub-feature.)

The inclusion of the $\alpha_{f(i), f(j)}$ term requires little memory relative to other portions of the model expressed in Equation 1. Specifically, for n features (not including sub-features), the additional memory required for the $\alpha_{f(i), f(j)}$ terms will be $O(n^2)$ in embodiments implementing the terms as a square n×n matrix. In comparison, other models that attempted to capture the importance of feature interactions would require considerably more memory, such as a model having a separate embedding matrix V for each feature, which would require approximately n times as much memory as is required for V. In many embodiments, the number of features n is around 12, and hence the additional memory required is proportional to $12^2=144$ additional terms, rather than requiring (n−1) times the size of V additional memory. Since the size of V in many embodiments is approximately 100 million items (i.e., the additional memory required is approximately $n*10^6$), the incorporation of the $\alpha_{f(i), f(j)}$ terms is vastly more memory-efficient than the use of separate embedding matrices for each feature.

The training system 110 computes the model parameters $w_o$, $w_i$, $<v_i, v_j>$, and $\alpha_{f(i), f(j)}$ jointly. In one embodiment, the parameters are updated using stochastic gradient descent, such as follow the regularized leader (FTRL) for the $w_i$ parameters, and adaptive gradient algorithm (AdaGrad) for the other parameters.

Figure 4:
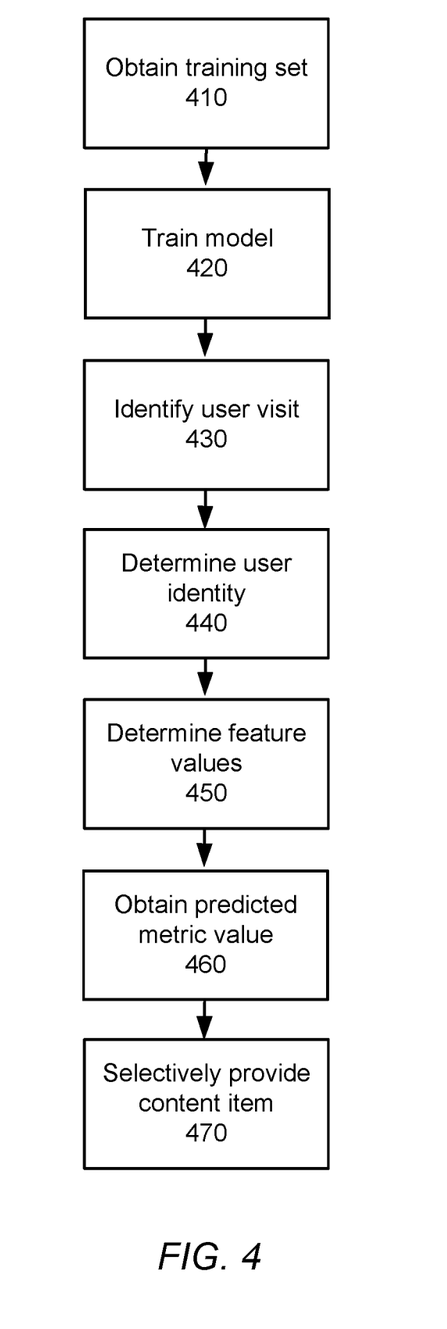
FIG. 4 is a flowchart illustrating training of a model for a given metric and using it to selectively provide content to a user, according to one embodiment.

FIG. 4 is a flowchart illustrating training of a model for a given metric and using it to selectively provide content to a user, according to one embodiment.

First, training set data is obtained 410. Each item of the training set data may be obtained from logs of a social networking system that indicate the outcomes with respect to a metric, and the values of the pertinent features that may influence the outcome with respect to the metric. For example, the metric might be click-through rate of an ad or other content item, and the features might include information about the content item (e.g., an identifier of the content item) and information about the current user (e.g., whether the current user had indicated approval of a given set of web pages on the social networking system).

A model is trained 420 using the training data. The training takes the known feature values (x) and metric outcomes (y) as input, and computes model parameter values $w_o$, $w_i$, $<v_i, v_j>$, and $\alpha_{f(i), f(j)}$ that best fit Equation 1 (above), given the known x and y values from the training data. In particular, the computation of the term $\alpha_{f(i), f(j)}$ takes into account the interactions of different pairs of features, thereby increasing model accuracy with only a relatively small increase in the amount of required memory.

With the model trained, a user visit to a web page of the social network system is identified 430, and the identity of the user on the social networking system is identified 440 (e.g., by reading a user ID of the user from a cookie). Feature values are determined 450 for the same features used to train the model; the feature values are based at least in part on information stored about the user, such as which of a canonical set of web pages the user has indicated approval for in the past (which can be determined by reading the data associated with the user's ID on the social networking system), and on a particular content item, such as an identifier of an ad whose suitability for the user is to be evaluated.

The determined feature values (which serve as the feature vector x in Equation 1) are provided as input to the trained model, and a predicted value of the metric is obtained 460 as a result. For example, the predicted metric value might indicate that it is highly likely that the given user would click on (or otherwise select) a given content item. Based upon the prediction, the content item is, or is not, provided 470 to the user. For example, if values of the metric are computed using the model for a number of different content items, content items with more favorable corresponding metric values (e.g., higher predicted click-through rates) would be more likely to be displayed to the user.

Social Networking System Environment and Architecture

Figure 5:
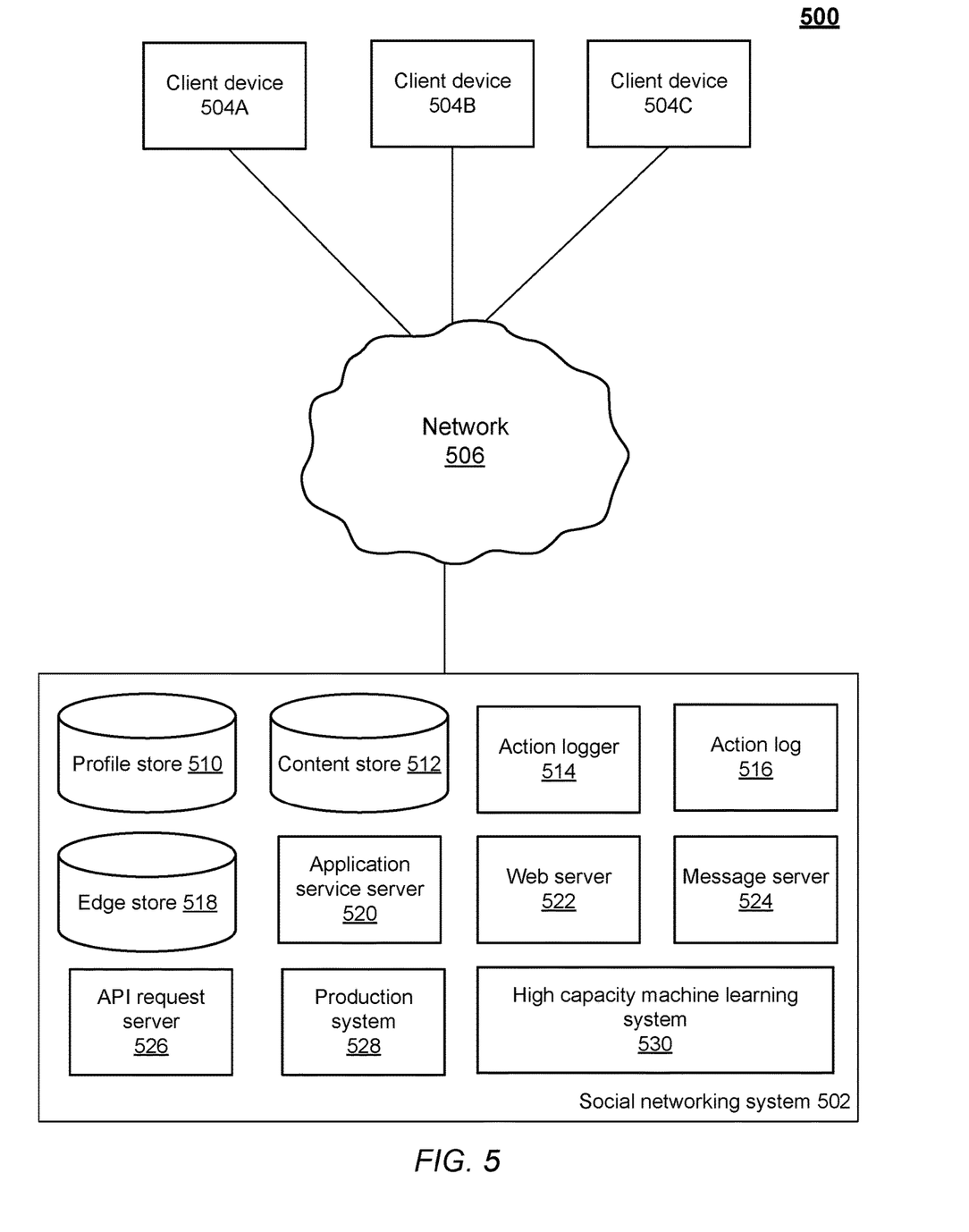
FIG. 5 illustrates an example architecture of a social networking system, in accordance with some embodiments.

FIG. 5 illustrates an example architecture 500 of a social networking system 502, in accordance with some embodiments. Several embodiments of the high-capacity machine learning system (e.g., the system 104 of FIG. 1) can utilize or be a part of the social networking system 502. Social networking systems commonly provide mechanisms enabling users to interact with objects and other users both within and external to the context of the social networking system. A social networking system user may be an individual or any other entity, e.g., a business or other non-person entity. The social networking system 502 may utilize a web-based interface or a mobile interface comprising a series of inter-connected pages displaying and enabling users to interact with social networking system objects and information.

A social networking system 502 may provide various means to interact with nonperson objects within the social networking system 502. For example, a user may form or join groups, or become a fan of a fan page within the social networking system 502. In addition, a user may create, download, view, upload, link to, tag, edit, or play a social networking system object. A user may interact with social networking system objects outside of the context of the social networking system 502. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

The client devices (e.g., client device 504A, client device 504B, and client device 504C) are configured to communicate with the social networking system 502 via a network channel 506 (e.g., an intranet or the Internet), where each client device 504A, 504B, 504C enables a user to interact with other users through the social networking system 502. The client device 504A, 504B, 504C is a computing device capable of receiving user input as well as transmitting and/or receiving data via the network channel 506. In at least one embodiment, the client device 504A, 504B, 504C is a conventional computer system, e.g., a desktop or laptop computer. In another embodiment, the client device 504A, 504B, 504C may be a device having computer functionality, e.g., a personal digital assistant (PDA), mobile telephone, a tablet, a smart-phone or similar device. In yet another embodiment, the client device 504A, 504B, 504C can be a virtualized desktop running on a cloud computing service. In at least one embodiment, the client device 504A, 504B, 504C executes an application enabling a user of the client device 504A, 504B, 504C to interact with the social networking system 502. For example, the client device 504A, 504B, 504C executes a browser application to enable interaction between the client device 504A, 504B, 504C and the social networking system 502 via the network channel 506. In another embodiment, the client device 504A, 504B, 504C interacts with the social networking system 502 through an application programming interface (API) that runs on the native operating system of the client device 504A, 504B, 504C, e.g., IOS® or ANDROID™.

The social networking system 502 includes a profile store 510, a content store 512, an action logger 514, an action log 516, an edge store 518, an application service server 520, a web server 522, a message server 524, an application service interface (API) request server 526, a production system 528, a high-capacity machine learning system 530, or any combination thereof. In other embodiments, the social networking system 502 may include additional, fewer, or different modules for various applications.

User of the social networking system 502 can be associated with a user profile, which is stored in the profile store 510. The user profile is associated with a social networking account. A user profile includes declarative information about the user that was explicitly shared by the user, and may include profile information inferred by the social networking system 502. In some embodiments, a user profile includes multiple data fields, each data field describing one or more attributes of the corresponding user of the social networking system 502. The user profile information stored in the profile store 510 describes the users of the social networking system 502, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 502 displayed in an image. A user profile in the profile store 510 may also maintain references to actions by the corresponding user performed on content items (e.g., items in the content store 512) and stored in the edge store 518 or the action log 516.

A user profile may be associated with one or more financial accounts, enabling the user profile to include data retrieved from or derived from a financial account. In some embodiments, information from the financial account is stored in the profile store 510. In other embodiments, it may be stored in an external store.

A user may specify one or more privacy settings, which are stored in the user profile, that limit information shared through the social networking system 502. For example, a privacy setting limits access to cache appliances associated with users of the social networking system 502.

The content store 512 stores content items (e.g., images, videos, or audio files) associated with a user profile. The content store 512 can also store references to content items that are stored in an external storage or external system. Content items from the content store 512 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 502. Examples of social networking content items include suggested connections or suggestions to perform other actions, media provided to, or maintained by, the social networking system 502 (e.g., pictures or videos), status messages or links posted by users to the social networking system, events, groups, pages (e.g., representing an organization or commercial entity), and any other content provided by, or accessible via, the social networking system.

Figure 6:
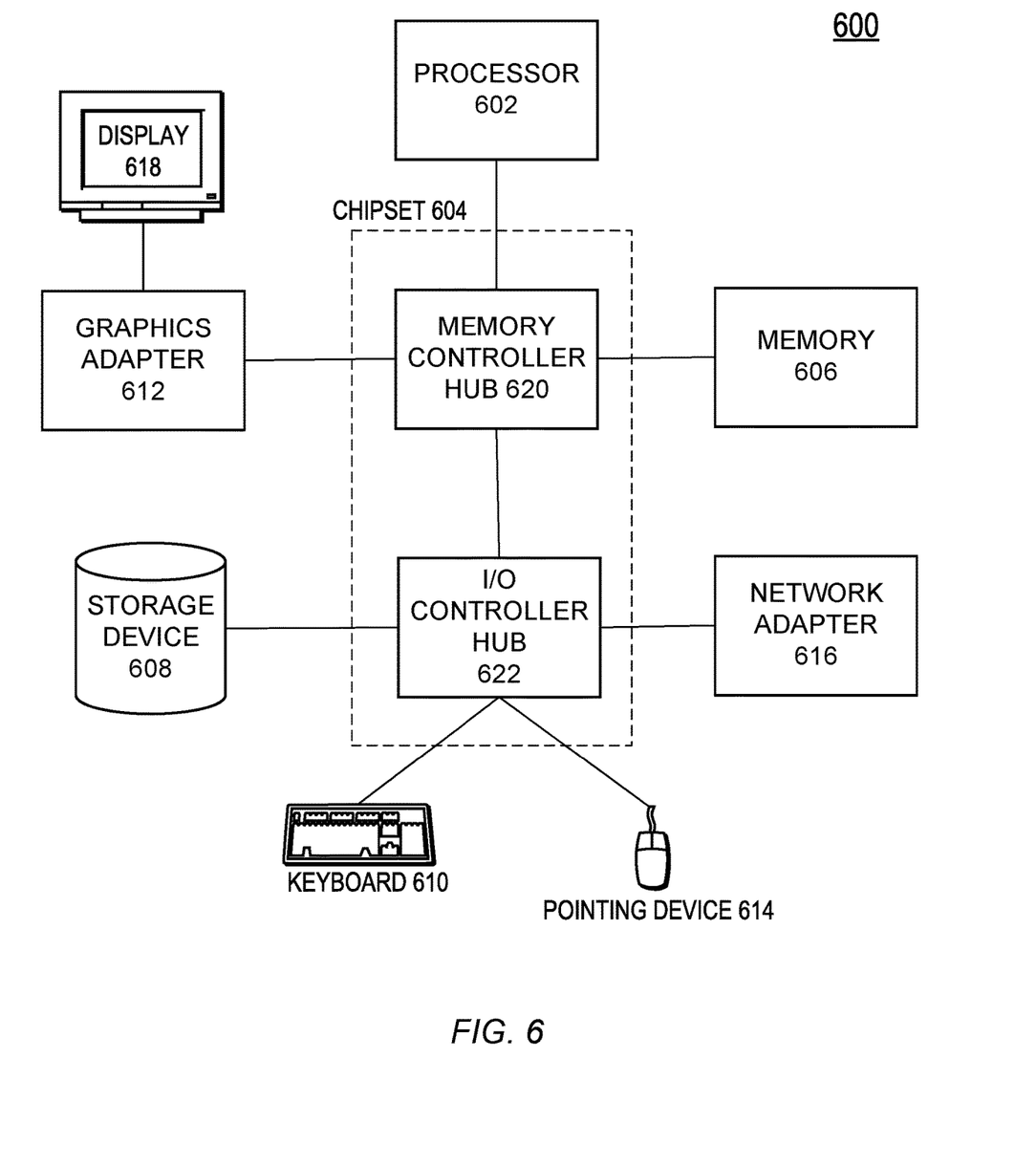
FIG. 6 is a high-level block diagram illustrating physical components of a computer used as part or all of the social networking system from FIG. 5, according to one embodiment.

FIG. 6 is a high-level block diagram illustrating physical components of a computer 600 used as part or all of the social networking system 502 from FIG. 5, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a graphics adapter 612, and/or display 618, as well as a keyboard 610 or pointing device 614. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a social networking system for selecting content for display to a user of the social network system, the method comprising:
    obtaining training set data comprising:
        for each of a plurality of features, a feature value of the feature for each item of the training set, the features including information about content items and about users of the social networking system, and
        for each item of the training set, a value of a metric;
    training a model to output a predicted value for the metric, the training comprising iteratively computing, based on the feature values and on the values of the metric:
        for each feature, a weight of the feature,
        for each pair of features of the plurality of features:
            an importance value indicating a predictive importance of an interaction between the pair of features, wherein the importance values for the pairs of features vary among different pairs of features, and
            a dot product of two vectors from an embedding matrix, the dot product modeling the interaction between the pair of features;
    identifying a visit of a user to a web page of the social networking system;
    determining an identity of the user on the social networking system;
    determining feature values for each of the plurality of features for the user visit based at least in part on information stored about the user on the social networking system and on information about a first content item;
    obtaining the predicted value of the metric by providing the determined feature values as input to the trained model, the obtaining comprising multiplying the importance values and the dot products;
    using the predicted value of the metric, determining whether to provide the first content item to the user; and
    responsive to determining to provide the first content item to the user, providing the first content item to the user.

2. A computer-implemented method comprising:
    obtaining feature values for each of a plurality of features;
    training a model to output a predicted value for a metric, the training comprising computing:
        for each pair of features of the plurality of features:
            an importance value quantifying a predictive importance of an interaction between the pair of features, wherein the importance values for the pairs of features vary among different pairs of features, and
            a dot product of two vectors from an embedding matrix, the dot product modeling the interaction between the pair of features;
    identifying a visit of a user to a web page and a candidate content item;
    determining feature values for each of the plurality of features based on the visit and the candidate content item; and
    obtaining the predicted value of the metric for the candidate content item by providing the determined feature values as input to the trained model, the obtaining comprising multiplying the importance values and the dot products.

3. The computer-implemented method of claim 2, wherein training the model comprises iteratively computing, based on the feature values and on known values of the metric for the feature values.

4. The computer-implemented method of claim 2, wherein the model is trained using stochastic gradient descent.

5. The computer-implemented method of claim 2, further comprising:
    obtaining predicted values of the metric for a plurality of other candidate content items; and
    selectively providing one or more of the candidate content items to the user based on the predicted metric values.

6. The computer-implemented method of claim 2, wherein the features include one or more of: features for the candidate content item and features for the user.

7. A non-transitory computer-readable storage medium storing instructions that, when executed by a computer processor, cause the computer processor to perform actions comprising:
    obtaining feature values for each of a plurality of features;
    training a model to output a predicted value for a metric, the training comprising computing:
        for each pair of features of the plurality of features:
            an importance value quantifying a predictive importance of an interaction between the pair of features, wherein the importance values for the pairs of features vary among different pairs of features, and
            a dot product of two vectors from an embedding matrix, the dot product modeling the interaction between the pair of features;
    identifying a visit of a user to a web page and a candidate content item;
    determining feature values for each of the plurality of features based on the visit and the candidate content item; and
    obtaining the predicted value of the metric for the candidate content item by providing the determined feature values as input to the trained model, the obtaining comprising multiplying the importance values and the dot products.

8. The non-transitory computer-readable storage medium of claim 7, wherein training the model comprises iteratively computing, based on the feature values and on known values of the metric for the feature values.

9. The non-transitory computer-readable storage medium of claim 7, wherein the model is trained using stochastic gradient descent.

10. The non-transitory computer-readable storage medium of claim 7, wherein the instructions further cause the computer processor to perform actions comprising:
    obtaining predicted values of the metric for a plurality of other candidate content items; and
    selectively providing one or more of the candidate content items to the user based on the predicted metric values.

11. The non-transitory computer-readable storage medium of claim 7, wherein the features include one or more of: features for the candidate content item and features for the user.

* * * * *